United States Patent [19]

Kawamoto et al.

[11] 4,308,764

[45] Jan. 5, 1982

[54] SHIFT CONTROL DEVICE FOR AUTOMATIC TRANSMISSION

[75] Inventors: Mutsumi Kawamoto; Nobuaki Miki, both of Nagoya, Japan

[73] Assignee: Aisin Warner, K.K., Anjo, Japan

[21] Appl. No.: 87,653

[22] Filed: Oct. 24, 1979

[30] Foreign Application Priority Data

Oct. 30, 1978 [JP] Japan .................. 53/133941
Dec. 7, 1978 [JP] Japan .................. 53-152180
Dec. 7, 1978 [JP] Japan .................. 53-152181

[51] Int. Cl.³ .................. F16H 3/74; B60K 41/06
[52] U.S. Cl. .................. 74/752 A; 74/752 C; 74/866; 74/869
[58] Field of Search .................. 74/866, 869, 843, 863, 74/856, 861, 752 A, 752 C, 752 D, 864

[56] References Cited

U.S. PATENT DOCUMENTS

| | | | |
|---|---|---|---|
| 3,621,735 | 11/1971 | Lemieux | 74/866 X |
| 3,678,787 | 7/1972 | Ito et al. | 74/864 |
| 3,709,066 | 1/1973 | Burcz | 74/869 X |
| 3,738,199 | 6/1973 | Kubo et al. | 74/869 |
| 3,750,495 | 8/1973 | Ito et al. | 74/866 |
| 3,797,330 | 3/1974 | Ushijima | 74/752 A |
| 3,823,621 | 7/1974 | Kubo et al. | 74/864 X |
| 3,903,759 | 9/1975 | Hashimoto | 74/866 |
| 3,922,933 | 12/1975 | Sakai | 74/866 |
| 3,938,409 | 2/1976 | Uozumi | 74/856 X |
| 3,943,799 | 3/1976 | Sakai et al. | 74/869 |

FOREIGN PATENT DOCUMENTS 1932986 1/1971 Fed. Rep. of Germany ........ 74/856

Primary Examiner—Leslie Braun
Attorney, Agent, or Firm—Cooper, Dunham, Clark, Griffin & Moran

[57] ABSTRACT

A shift control device for an automatic transmission relating to this invention comprises: an electric control circuit comprising a means for generating an electric signal in accordance with the running conditions of the vehicle and a logic circuit for receiving the signals from said means and generating an electric output signal corresponding to one of the gears; a first solenoid to supply and discharge fluid pressure in fluid passages, said first solenoid acting in response to said electric output signal; a first shift valve operable between upshift and down-shift positions, the position of said first shift valve controlled by said first solenoid; a second solenoid to supply and discharge fluid pressure in fluid passages, said second solenoid acting in response to said electric output signal; and second and third shift valves operable between upshift and downshift positions, the positions of said second and third shift valves controlled by said second solenoid and by the position of said first shift valve; and two shift valves controlled by the second solenoid valve; whereby the shift control device performs automatic gear-shifting of an automatic transmission with four forward gears or one with three forward gears and a mechanical drive with a torque converter lock-up clutch engaged.

8 Claims, 5 Drawing Figures

SHIFT CONTROL DEVICE FOR AUTOMATIC TRANSMISSION

BACKGROUND OF THE INVENTION

1. Field of the Invention

This invention relates to a shift control device for an automatic transmission employing an electronic control, and more particularly to a shift control device which performs automatic gear-shifting of four speed or of three speed automatic transmissions including one with a mechanical drive with a torque converter lock-up clutch engaged.

2. Description of the Prior Art

Two types of shift control devices for automatic transmissions are known: one controls gear-shifting entirely by the hydraulic servo system and the other employs an electronic control to enable accurate gear-shifting at an exact vehicle speed. In shift control devices of the electronic type, as the number of gears increases the number of shift valves also increases, so that the number of electronically controlled solenoid valves increases thereby complicating the electric control circuit. For this reason, various shift control devices of the electronic type have been proposed in which the number of components such as shift valves is reduced. Conventional shift control devices, however, do not incorporate satisfactory countermeasures against erroneous operation due to sticking of valves and shocks produced when the shift lever is shifted from N-position to D-position. Furthermore, the amount of pressurized oil delivered from an oil pump to hydraulic circuits increases in proportion to the engine speed; therefore a small amount of oil pumped out when the engine is rotating at low speed is likely to result in the lack of oil supply. To reduce the amount of oil discharged and prevent the oil shortage in the hydraulic servo system, a large oil pump may be used or all the solenoid valves may be closed in the 1st gear when the engine is running at low speed. However, the former countermeasure has the disadvantage that a large portion of the engine output must be consumed for driving the large oil pump. The latter countermeasure has the disadvantage that if a fault or breakage of wire occurs while the vehicle is traveling at high speed, the solenoid valves will be deenergized and closed, causing a downshift to 1st gear and dangerous abrupt engine braking.

SUMMARY OF THE INVENTION

It is an object of this invention to provide a shift control device for an automatic transmission wherein three shift valves are controlled by two solenoid valves.

Another object of this invention is to provide a shift control device for an automatic transmission which prevents erroneous gear-shifting caused by sticking of valves.

Still another object of this invention is to provide a shift control device for an automatic transmission which is fail-safe and in which the amount of oil drained in the hydraulic control circuit is small.

A further object of this invention is to provide a shift control device for an automatic transmission which does not produce shocks when the N–D shift is effected and also prevents noise in the transmission when the gear is set at the neutral position.

DESCRIPTION OF THE PREFERRED EMBODIMENT

Figure 1:
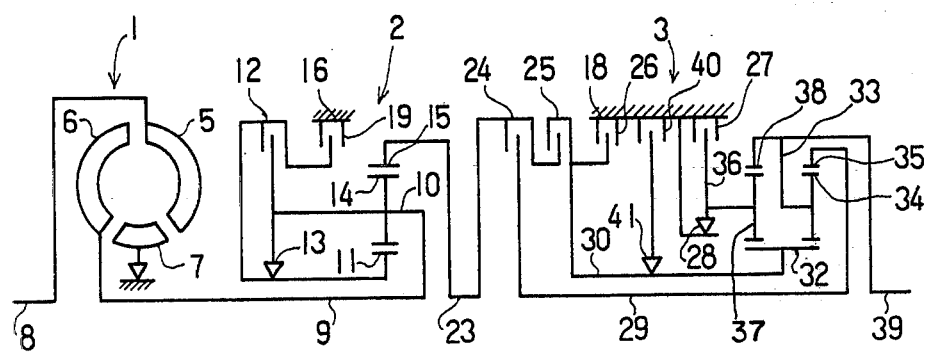
FIG. 1 is a schematic diagram showing a hydraulically controlled four speed automatic transmission, whose gear-shifting is controlled by a shift control device according to this invention.
Figure 2:
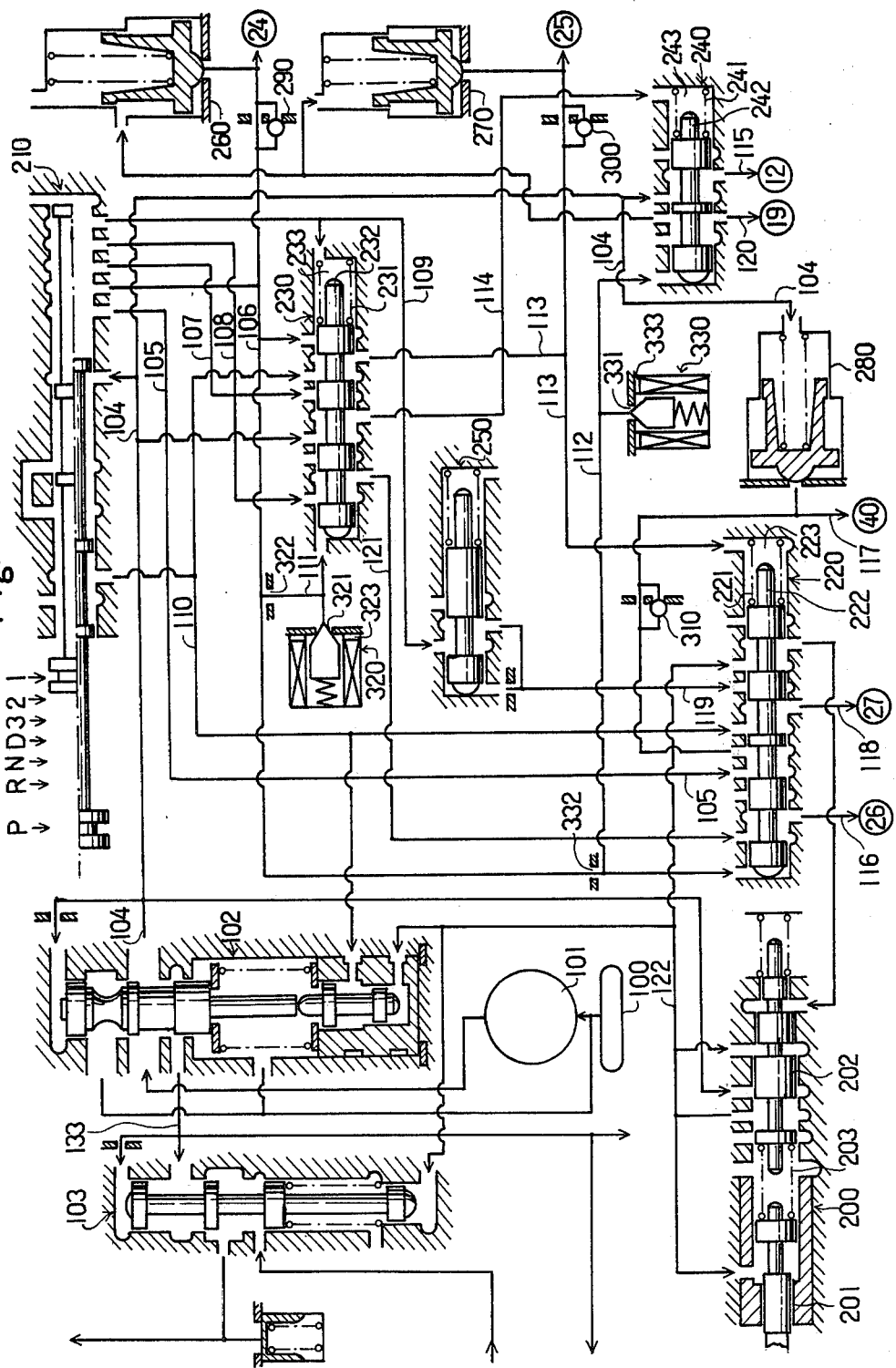
FIG. 2 is a circuit diagram showing one embodiment of a hydraulic control circuit of the shift control device for an automatic transmission according to this invention.

FIG. 1 illustrates a schematic diagram of a hydrau-kinetic type automatic transmission having four forward speeds, of which the 4th gear is an overdrive shift stage, and one rearward speed stage. The automatic transmission has a torque converter 1, an overdrive mechanism 2 for the 4th speed gear and a transmission gear train 3 for three forward speeds and one reverse drive, and is controlled by a hydraulic control device as shown in FIG. 2. The torque converter 1 is of known construction including a pump 5, a turbine 6 and a stator 7, with the pump 5 and the turbine 6 connected to an engine crank shaft 8 and a transmission input shaft 9, respectively. An input shaft 9 of the overdrive mechanism 2 is connected to a carrier 10 of a planetary gearing in the overdrive mechanism. A planetary pinion 14 rotatably supported by the carrier 10 is in mesh with a sun gear 11 and a ring gear 15. A multiple disc clutch 12 and a one-way clutch 13 are provided between the sun gear 11 and the carrier 10, while a multiple disc brake 19 is interposed between the sun gear 11 and a housing or overdrive case 16 enclosing the overdrive mechanism.

The ring gear 15 of the overdrive mechanism 2 is connected to an input shaft 23 of the transmission gear mechanism 3. A multiple clutch 24 is provided between the input shaft 23 and an intermediate shaft 29, and another multiple clutch 25 is interposed between the input shaft 23 and a sun gear shaft 30. Provided between the sun gear shift 30 and a transmission case 18 are a multiple disc brake 26, a multiple disc brake 40 and a one-way clutch 41. A sun gear 32 mounted on the sun gear shaft 30 forms two planetary gearing systems, together with a carrier 33, a planetary pinion 34 supported on the carrier 33, a ring gear 35 in mesh with the pinion 34, another carrier 36, a planetary pinion 37 supported on the carrier 36, and a ring gear 38 in mesh with the pinion 37. The ring gear 35 of one of the planetary gearing systems is connected with the intermediate shaft 29. The carrier 33 of this planetary gearing system is connected with the ring gear 38 of another planetary gearing system, and the carrier 33 and the ring gear 38 are connected to an output shaft 39. Between the carrier 36 of the latter planetary gearing system and the transmission case 18 are provided a multiple brake 27 and a one-way clutch 28.

Controlled by a hydraulic control device detailed in FIG. 2, the hydrau-kinetic type automatic transmission with an overdrive mechanism shown in FIG. 1 effects engagement or disengagement of clutches and brakes in accordance with the engine output and the vehicle speed, thereby accomplishing automatic gear-changing among four forward gears including an overdrive shift stage (O/D), and one rearward manual gear-changing.

level (line pressure) by the pressure regulating valve 102 and is delivered to passages 104 and 133. The hydraulic pressure supplied to the second pressure regulating valve 103 through the passage 133 is adjusted to a torque converter pressure, a lubricating oil pressure and a cooler pressure, according to a throttle pressure of the throttle valve 200. The manual valve 210 that communicates to the passage 104 is connected to a shift lever (not

TABLE I

| Shift position | Friction engagement means | | | | | | | | | |
|---|---|---|---|---|---|---|---|---|---|---|
| | Clutch 12 | Clutch 24 | Clutch 25 | Brake 19 | Brake 26 | Brake 27 | Brake 40 | One-way clutch 13 | One-way clutch 28 | One-way clutch 41 |
| Parking (P) | O | X | X | X | X | O | X | | | |
| Reverse (R) | O | X | O | X | X | O | X | Lock | Lock | |
| Neutral (N) | O | X | X | X | X | X | X | | | |
| Forward drive | | | | | | | | | | |
| D-range | | | | | | | | | | |
| 1st | O | O | X | X | X | X | X | Lock | Lock | Over-run |
| 2nd | O | O | X | X | X | X | O | Lock | Over-run | Lock |
| 3rd | O | O | O | X | X | X | O | Lock | over-run | over-run |
| O D | X | O | O | O | X | X | O | Over-run | Over-run | Over-run |
| 2-range 3-range | | | | | | | | | | |
| 1st | O | O | X | X | X | X | X | Lock | Lock | Over-run |
| 2nd | O | O | X | X | X | X | O | Lock | Over-run | Lock |
| 3rd | O | O | O | X | X | X | O | Lock | Over-run | Over-run |
| 1st | O | O | X | X | X | X | X | Lock | Lock | Over-run |
| 2nd | O | O | X | X | O | X | O | Lock | Over-run | Lock |
| L-range | O | O | X | X | X | O | X | Lock | Lock | Over-run |

Table I shows relations between the operating conditions of the clutches and brakes and the shift positions.

In Table I, the mark "O" indicates that the clutch or brake of interest is engaged and "X" shows they are in a disengaged condition.

Referring to one embodiment of a hydraulic control circuit of the shift control device shown in FIG. 2, we will now explain the shift control device for automatic transmissions according to this invention, which selectively actuates the clutches 12, 24, 25 and the brakes 19, 26, 27, 40 and thereby performs automatic as well as manual gear-changing.

The hydraulic circuit comprises: an oil reservoir 100, an oil pump 101, a pressure regulating valve 102, a second pressure regulating valve 103, a throttle valve 200, a manual valve 210, a 1-2 shift valve 220, a 2-3 shift valve 230, a 3-4 shift valve 240, a low cost modulator valve 250 for regulating the hydraulic pressure supplied to the brake 27, an accumulator 260 for ensuring smooth engagement of the clutch 24, an accumulator 270 for ensuring smooth engagement of the clutch 25, an accumulator 280 for ensuring smooth engagement of the brake 40, flow control valves 290, 300, 310 with a check valve for controlling the flow of the pressurized oil to the clutches 24, 25 and the brake 27, a first solenoid valve 320 adapted to be opened or closed by outputs from an electric control circuit (computer) for controlling the 2-3 shift valve, a second solenoid valve 330 for controlling both the 1-2 shift valve and the 3-4 shift valve, and oil passages that connect various valves and hydraulic servos of the clutch and brakes.

The pressure of oil pumped up from an oil reservoir 100 by an oil pump 101 is adjusted to a predetermined shown in the figure) and is shifted to one of the positions P, R, N, D, 3, 2 and L by the manually operated shift lever. Table II shows whether the passages 105–110 communicate to the passage 104 at each position of the shift lever. The mark "O" indicates the passage of interest is in communication with the passage 104.

TABLE II

| Shift lever position | P | R | N | D | 3 | 2 | L |
|---|---|---|---|---|---|---|---|
| Passage 105 | | | O | O | O | O | O |
| Passage 106 | | | | O | O | O | O |
| Passage 107 | | | | | O | O | O |
| Passage 108 | | | | | | O | O |
| Passage 109 | | | | | | | O |
| Passage 110 | O | | | | | | |

When deenergized, the first solenoid valve 320 for controlling the 2-3 shift valve 230 closes a port 321 to generate the line pressure in the passage 111 which communicates to the passage 106 through an orifice 322 and, when energized, opens the port 321 to discharge the oil pressure in the passage 111 from an oil discharge port 323. The second solenoid valve 330 for controlling both the 1-2 shift valve 220 and the 3-4 shift valve 240 closes a port 331, when deenergized, to develop the line pressure in the passage 112 communicating to the passage 106 through an orifice 332 and, when energized, opens its port 331 to exhaust the oil pressure in the passage 112 from an oil discharge port 333. Table III shows the relation between the gear stage of the automatic transmission and the condition of the first and second solenoid valves 320 and 330 which are controlled by the electric control circuit to be described later.

TABLE III

| Gear stage | N | 1st speed | 2nd speed | 3rd speed | 4th speed |
|---|---|---|---|---|---|
| 1st solenoid valve | de-energized | energized | energized | de-energized | de-energized |
| 2nd solenoid valve | de-energized | de-energized | energized | de-energized | de-energized |

The 1-2 shift valve 220 has a spool 222 with a spring 221 bearing on one end thereof. The second solenoid valve 330 is deenergized at the 1st speed stage thereby developing the line pressure in the passage 112, so that the spool 222 is shifted toward the right. At the second speed stage, the solenoid valve 330 is energized discharging the oil pressure in the passage 112 and moving the spool 222 to the left. At the 3rd and 4th gears the line pressure is supplied through the passage 113 to the oil chamber 223 formed at the right end of the shift valve 220 to displace the spool 222 toward the left.

The 2-3 shift valve 230 has a spool 232 with a spring 231 bearing on one end thereof. At the 1st and 2nd gears the first solenoid valve 320 is energized and the line pressure is not developed at the passage 111 so that the spool 232 is set to the left-hand position in the figure by the action of the spring 231. At the 3rd and 4th gears the solenoid valve 320 is deenergized generating the line pressure in the passage 111, which in turn causes the spool 232 to move toward the right.

The 3-4 shift valve 240 has a spool 242 with a spring 241 bearing against one end thereof. At the 1st and 2nd stages, the line pressure is conducted into the oil chamber 243 through the passage 114 to hold the spool 242 at the left-hand position. At the 3rd gear, the solenoid valve 330 is energized thereby discharging the pressure in the passage 112 so that the spool 242 is maintained at the left-hand position by the action of the spring 241. At the 4th stage the solenoid valve 330 is deenergized, with the result that the spool 242 is shifted to the right.

A throttle pressure is developed in the passage 122 by the throttle valve 200 whose indicator valve 201 is displaced in accordance with the amount of depression of the accelerating pedal and compresses a spring 203 interposed between the indicator valve 201 and a valve spool 202.

When the manual valve 210 is set at the N-position, the passage 104 communicates with the passage 115 thereby engaging the clutch 12. At the same time, the passage 105 is supplied the line pressure and, since the solenoid valve 330 is deenergized, the spool 222 of the 1-2 shift valve 220 is shifted to the left-hand position by the spring 221, with the result that the passage 105 is connected with the passage 117 and the brake 40 becomes engaged. When the manual valve is shifted from the N-position to the D-position, the electric control circuit energizes the solenoid valves 320 and 330 for a predetermined time period (one or two seconds) to supply the oil pressure to the passage 106. This causes the clutch 24 connected to the passage 106 to be engaged, while the pressure in the passage 117 is maintained. As a result, the gear is shifted to the 2nd gear. Since the torque to the output shaft 39 is smaller at the 2nd speed stage than at the 1st stage, the shock produced by the N-D shift becomes smaller when the gear is set at the 2nd gear than when set at the 1st gear. At the neutral position the gears do not rotate idly since no clutch except for the brake 40 in the planetary gearing mechanism is engaged. After the predetermined time period, the electric control circuit issues a first stage signal to deenergized the solenoid valve 330, developing the line pressure in the passage 112 and displacing the spool 222 of the 1-2 shift valve 220 to the right-hand position. As a result, the pressure in the passage 117 is discharged and the brake 40 is disengaged, thereby accomplishing the gear-shifting to the 1st gear. At the first stage of speed, the spool 222 of the 1-2 shift valve 220 occupies the right-hand position in the figure, the pressure in the passages 116 and 117 communicating to the brakes 26 and 40 is discharged, and there is no line pressure in the passage 118 connected to the brake 27; hence the brakes 26, 40, 27 are disengaged. When the vehicle speed reaches a certain level, the computer outputs a signal to energize the solenoid valve 330 causing the spool 222 of the 1-2 shift valve to assume the left-hand position, with the result that the line pressure in the passage 105 is conducted to the passage 117 to engage the brake 40 and the pressure in the passage 118 is discharged. This completes the gear-changing to the 2nd gear. When the opening degree of the throttle and the vehicle speed reach the predetermined values, the computer outputs a signal to deenergize the solenoid valve 320, which in turn causes the spool 232 of the 2-3 shift valve 230 to move toward the right, bringing the passage 113 in communication with the passage 106 and engaging the clutch 25, while at the same time the spool 222 of the 1-2 shift valve 220 is held at the left-hand position. This process effects the gear-shifting to the 3rd gear. Likewise, in shifting the gear to the 4th gear, the solenoid valve 330 is deenergized by an output from the computer, so that the spool 242 of the 3-4 shift valve 240 is displaced toward the right in the figure, discharging the pressure in the passage 115 and supplying the hydraulic pressure to the passage 120. As a result the clutch 12 is disengaged and the brake 19 is engaged.

When the manual valve 210 is set at the 3-position, the gear-changing to the 1st, 2nd and 3rd gears is effected in the same manner as when the manual valve is in the D-position, except that the further upshifting to the 4th gear is blocked since the line pressure is admitted to the oil chamber 243 at the right end of the 3-4 shift valve through the packages 107 and 114 to maintain the spool 242 at the left-hand position. If the manual valve 210 is shifted from D to 3-position when the vehicle is traveling at the 4th stage of speed, the downshifting to the 3rd gear is immediately effected.

With the manual valve 210 set at the 2-position, the 1st gear is obtained in the same manner as when the manual valve is in the D-position. At the 2nd gear with the manual valve 210 set at the 2-position, the hydraulic pressure is allowed to flow into the passage 108, from which it is further led into the passages 121 and 116 so as to engage the brake 26 and effect the engine brake. If the manual valve is shifted to the 2-position while the vehicle is running at the 3rd gear, the vehicle slows down to a certain speed, at which time the computer outputs a signal to energize the solenoid valve 320 thus performing the 3-2 downshift.

When the manual valve 210 is shifted to the L-position, the line pressure is supplied through the passage 109 to the oil chamber 233 formed at the right end of the 2-3 shift valve 230, so that the spool 232 is pushed to the left-hand position thereby accomplishing an immediate downshift from 4th to 2nd or from 3rd to 2nd gear. The 2-1 downshift is effected when the vehicle speed decreases to a predetermined level and the solenoid valve 330 is deenergized by an output from the computer. At this time, the line pressure in the passage 109 acts upon the brake 27 through the passages 119 and 118 and engages it.

Figure 3:
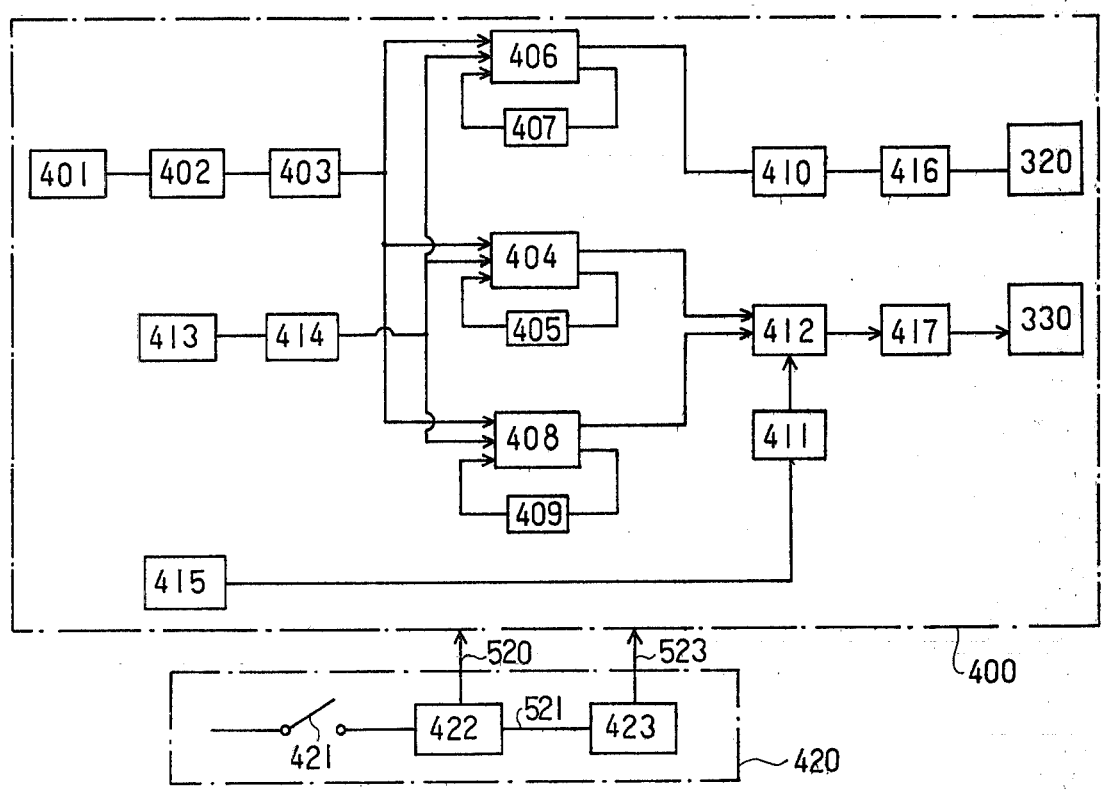
FIG. 3 is a circuit diagram showing an electric control circuit which controls the hydraulic control circuit of FIG. 2.

Referring to the block diagram shown in FIG. 3, the electric control circuit (computer) which opens or closes the first and second solenoid valves 320 and 330 in accordance with the traveling conditions of the vehicle will now be explained.

The electric control circuit comprises a power unit 420 and a computer circuit 400 which actuates the solenoid valves 320 and 330 according to signals received from a vehicle speed and throttle opening degree detecting device. The power unit 420 is connected through a switch 421 to a battery and includes a position switch 422 fitted to the manual lever and connected to a position setting (D, 3, 2 and L-position) device through wiring 520 and a power supply (a constant voltage source supplying unit) 423 connected to the position switch 422 through wiring 521. The power unit 420 supplies constant voltages from the power supply 423 to various component elements of the computer 400 through wiring 523. The computer circuit 400 comprises a vehicle speed detection device 401, a waveform amplifying and shaping circuit 402, a digital-analog conversion circuit 403, a throttle position switch 413, a throttle opening degree voltage generator circuit 414, a 1-2 shift detection circuit 404, a 2-3 shift detection circuit 406, a 3-2 shift detection circuit 408, hysteresis circuits 405, 407, 409, solenoid valves 320, 330, an open-close selection circuit 410 for the solenoid valve 320, another open-close selection circuit 412 for the solenoid valve 330, a N-D shift signal generator 415, a timer 411, and amplifiers 416, 417. The vehicle speed detected by the vehicle speed detection device 401 is converted into a sinusoidal wave signal which is further shaped and amplified by the waveform amplifying and shaping circuit 402 to form positive rectangular wave signals. The positive rectangular wave signals are converted by the digital-analog converter circuit 403 into DC voltage signals in accordance with the vehicle speed. The throttle position switch 413 that detects the engine load condition comprises a variable resistor which varies according to the throttle opening degree. The signal generated by the throttle position switch 413 according to the throttle opening degree is converted into DC voltage by the throttle opening degree voltage generator circuit 414. The first voltage representing the vehicle speed and the second voltage representing the throttle opening degree are each supplied to the 1-2 shift detection circuit 404, the 2-3 shift detection circuit 406 and the 3-4 shift detection circuits compares the vehicle speed voltage signal with the throttle opening degree voltage signal in a comparing circuit such as a differential amplifying circuit to determine the condition for effecting 1-2, 2-3 or 3-4 shifting. The hysteresis circuits 405, 407, 409 give conditions for effecting 2-1, 3-2 and 4-3 downshifts, respectively, and are arranged such that the downshift is effected at a lower speed than when the gear is upshifted, so as to prevent hunting in a speed range of gear-shifting. In response to the output from the 2-3 shift detection circuit, the open-close selection circuit 410 for the solenoid valve 320 outputs on-off signals to open or close the solenoid valve 320 through the amplifier 416. The open-close selection circuit 412 for the solenoid valve 330 outputs on-off signals in response to the outputs from the 1-2 shift detection circuit 404 and the 3-4 shift detection circuit 408 as well as the output from the N-D shift signal generator. The on-off signals output from the open-close selection circuit 412 is amplified by the amplifier 417 to open or close the solenoid valve 330.

In this embodiment of the shift control device for the automatic transmission, two solenoid valves 320, 330 are opened or closed as shown in Table III by the electric control circuit, and at the 1st gear where the engine revolution speed is low only one solenoid valve is energized to discharge hydraulic pressure in a passage so as to keep the amount of oil drained to a minimum and preclude an oil shortage. Should the solenoid valves be deenergized due to faults in the electric control circuit while the vehicle is traveling at high speed, the gear is prevented from being downshifted to the 1st stage so as to preclude danger caused by an abrupt engine brake.

When the shift lever is shifted from N-position to D-position, the electric control circuit 400 issues output signals for a predetermined time period to establish the 2nd gear, as shown in Table III. At this time, since the brake 40 that must be engaged at the 2nd gear was already engaged by hydraulic pressure supplied through passages 105, 117 when the manual valve 210 was in the N-position, the smooth gear-changing to the 2nd gear can be performed. The torque of the output shaft is smaller at the 2nd gear than at the 1st gear; therefore the shock caused by the N-D shift becomes smaller when the gear is set at the 2nd gear than when set at the 1st gear. In addition, since the clutch 12 is released when the manual valve 210 is in the N-position, the gears in the planetary gearing transmission mechanism 3 does not rotate idly. This prevents noise due to idle rotation of gears as well as shocks produced when the idling gears are abruptly stopped. Since the 1-2, 2-3 and 3-4 shifting are each performed by independent shift valves, the shifting action is reliable precluding false shifting due to sticking of valves. Furthermore, since only two solenoid valves are employed to control three shift valves, the electric circuit and the hydraulic circuit become simpler and the number of components is smaller than when each shift valve is controlled by an individual solenoid valve.

Figure 4:
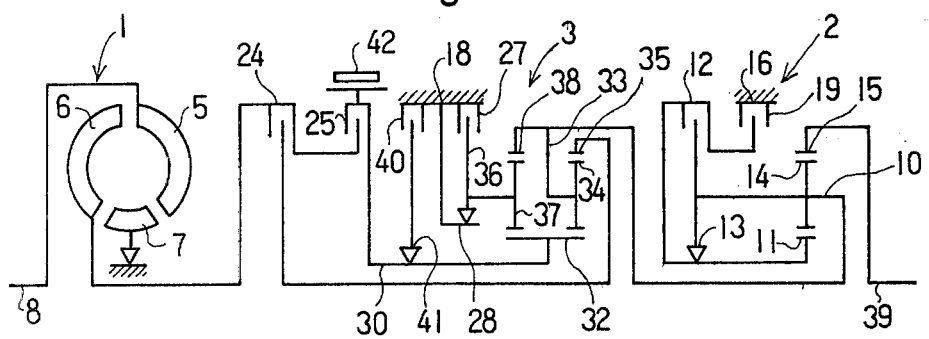
FIG. 4 is a schematic diagram showing another hydraulically controlled four speed automatic transmission, whose gear-shifting is controlled by the shift control device according to this invention.

FIG. 4 is a schematic diagram showing another embodiment of a four-forward-stage automatic transmission controlled by the shift control device of this invention. The same reference numerals assigned to components in FIGS. 1 and 4 indicate the components are identical with each other. Reference numeral 42 denotes a brake handle. A gear transmission mechanism 3 with three forward stages and one rearward stage is provided between a torque converter 1 and an overdrive mechanism 2.

Figure 5:
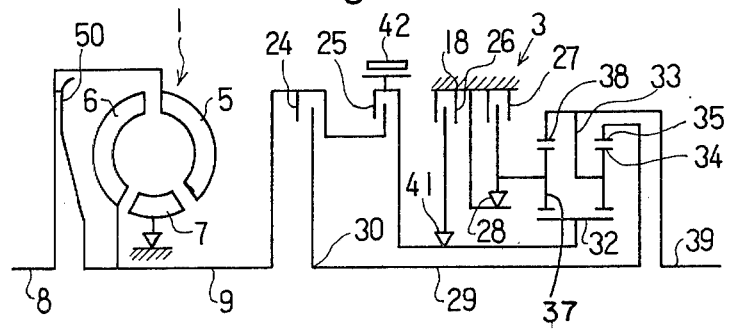
FIG. 5 is a schematic diagram showing still another three speed automatic transmission with a torque converter lock-up clutch.

FIG. 5 is a schematic diagram showing a three-stage automatic transmission with a lock-up mechanism. Designated by 50 is a clutch for directly connecting an engine crank shaft 8 with a turbine shaft 9. Other components are identical with those in FIGS. 1 and 4 having the same reference numerals. The shift control device for the embodiment shown in FIG. 5 has the same electric control circuit as that incorporated in the shift control device of FIG. 2. The hydraulic control device for this embodiment has a clutch 50 instead of the clutch 12 and the brake 19 in the foregoing embodiment, and also has a 3-lock-up shift valve instead of the 3-4 shift valve 240, whereby after the gear has been automatically shifted to the 3rd stage and the vehicle speed reaches a predetermined level, the solenoid valve 330 is deenergized by the computer output to actuate the 3-lock-up shift valve and thereby supply hydraulic pressure to the clutch 50 so as to engage the clutch 50 and effect the lock-up drive. In this way, the shift control device in this embodiment controls three shift valves—1-2, 2-3 and 3-lock-up shift valves—by two solenoid valves. This ensures reliable operation and makes the structure of the shift control device simple.

We claim:

1. A shift control device for an automatic transmission having shiftable gears, comprising:
   (a) an electric control circuit comprising signal generating means for generating an electric signal in accordance with the vehicle running conditions and a logic circuit for receiving said electric signal and generating an electric output signal corresponding to one of the gears;
   (b) a first solenoid to supply and discharge fluid pressure in fluid passages, said first solenoid acting in response to said electric output signal;
   (c) a first shift valve operable between upshift and downshift positions, the position of said first valve controlled by said first solenoid;
   (d) a second solenoid to supply and discharge fluid pressure in fluid passages, said second solenoid acting in response to said electric output signal; and
   (e) second and third shift valves operable between upshift and downshift positions, the positions of said second and third shift valves controlled by said second solenoid and by the position of said first shift valve.

2. The shift control device of claim 1 wherein said automatic transmission has four forward speed ranges and one reverse range.

3. The shift control device of claim 2 wherein the first shift valve is a 2-3 shift valve, the second shift valve is a 1-2 shift valve and the third shift valve is a 3-4 shift valve.

4. The shift control device of claim 1 wherein said automatic transmission has three forward speed ranges, one reverse range, and a torque converter lock-up mechanism.

5. The shift control device of claim 4 wherein the first shift valve is a 2-3 shift valve, the second shift valve is a 1-2 shift valve, and the third shift valve is a 3-lock-up shift valve.

6. The shift control device of claim 2 or 4 wherein the first forward speed range is established when one of the solenoids is energized while the other solenoid is deenergized.

7. The shift control device of claim 2 or 4 further comprising a manual valve, wherein said electric control circuit generates an electric output signal corresponding to the second or third forward speed range for a predetermined time when the manual valve is shifted from the neutral position to the forward drive position.

8. The shift control device of claim 7 wherein said electric control circuit generates an electric output signal when the manual valve is set in the neutral position to engage a brake which is engaged in the second or third forward speed range.

* * * * *